United States Patent
Kaal et al.

(10) Patent No.: US 8,320,546 B2
(45) Date of Patent: Nov. 27, 2012

(54) COMMUNICATON SYSTEM

(75) Inventors: Madis Kaal, Dublin (IE); Andres Kütt, Dublin (IE); Mart Oruaas, Dublin (IE); Asko Seeba, Dublin (IE); Taavet Hinrikus, Dublin (IE)

(73) Assignee: Skype, Dublin (IE)

( * ) Notice: Subject to any disclaimer, the term of this patent is extended or adjusted under 35 U.S.C. 154(b) by 906 days.

(21) Appl. No.: 11/986,972

(22) Filed: Nov. 27, 2007

(65) Prior Publication Data
US 2008/0152108 A1 Jun. 26, 2008

(30) Foreign Application Priority Data

Nov. 27, 2006 (GB) .................................... 0623621.0
Nov. 23, 2007 (GB) .................................... 0723118.6

(51) Int. Cl.
*H04M 3/42* (2006.01)
*H04M 1/56* (2006.01)
*H04M 15/06* (2006.01)
(52) U.S. Cl. .......... 379/207.13; 379/142.01; 379/142.04
(58) Field of Classification Search ............. 379/207.13, 379/207.15, 201.01, 142.01, 142.06, 142.04; 455/461
See application file for complete search history.

(56) References Cited

U.S. PATENT DOCUMENTS

| | | | |
|---|---|---|---|
| 6,061,363 A | 5/2000 | Evans et al. | |
| 6,718,028 B2 | 4/2004 | Culli et al. | |
| 6,765,921 B1 | 7/2004 | Stacey et al. | |
| 7,177,837 B2 | 2/2007 | Pegaz-Paquet et al. | |
| 7,298,714 B2 | 11/2007 | Foster | |
| 7,403,517 B2 | 7/2008 | Westman | |
| 7,454,201 B2 | 11/2008 | Brooking et al. | |
| 7,565,436 B2 | 7/2009 | Rabie et al. | |
| 7,675,881 B2 | 3/2010 | Verma et al. | |
| 7,735,126 B2 | 6/2010 | Zhang et al. | |
| 7,756,548 B2 | 7/2010 | Laroia et al. | |

(Continued)

FOREIGN PATENT DOCUMENTS

CN 1839594 9/2006
(Continued)

OTHER PUBLICATIONS

Notification Concerning Transmittal of International Preliminary Report on Patentability (Chapter for the Patent Cooperation Treaty), from International Application No. PCT/1132007/004259, dated Jun. 11, 2009.

(Continued)

*Primary Examiner* — Thjuan K Addy
(74) *Attorney, Agent, or Firm* — Wolfe-SBMC

(57) ABSTRACT

A data store associates a first identity recognizable in a first network with a second identity recognizable in a second network for both a user and a calling entity. Both identities for the calling entity are provided to the receiving device via the second network. A node receives the communication event with the second identity for the calling entity, the communication event being addressed with the second identity of the user. The data store is queried with the second identities of the calling entity and user to determine the first identities of the calling entity and user. The receiving device receives the communication event with the first identity for the calling entity via the first network, the communication event being addressed with the first identity of the user. The receiving device determines the second identity of the calling entity using the first identity of the calling entity.

20 Claims, 6 Drawing Sheets

U.S. PATENT DOCUMENTS

| | | |
|---|---|---|
| 7,839,992 B2 | 11/2010 | Croak et al. |
| 7,929,955 B1 | 4/2011 | Bonner |
| 8,014,511 B2 | 9/2011 | Kaal et al. |
| 8,170,563 B2 | 5/2012 | Kaal |
| 8,175,091 B2 | 5/2012 | Kaal |
| 8,238,539 B2 | 8/2012 | Kaal |
| 2002/0032631 A1 | 3/2002 | Rose |
| 2002/0071424 A1 | 6/2002 | Chiu et al. |
| 2002/0103998 A1 | 8/2002 | DeBruine |
| 2002/0116464 A1 | 8/2002 | Mak |
| 2002/0137500 A1 | 9/2002 | Brooking et al. |
| 2002/0143855 A1 | 10/2002 | Traversat et al. |
| 2003/0002485 A1 | 1/2003 | Emerson et al. |
| 2003/0105812 A1 | 6/2003 | Flowers, Jr. et al. |
| 2003/0112823 A1 | 6/2003 | Collins et al. |
| 2003/0130008 A1 | 7/2003 | Rajaniemi et al. |
| 2003/0224781 A1 | 12/2003 | Milford et al. |
| 2005/0005030 A1 | 1/2005 | Asai |
| 2005/0074102 A1 | 4/2005 | Altberg et al. |
| 2005/0141509 A1 | 6/2005 | Rabie et al. |
| 2005/0144327 A1 | 6/2005 | Rabie et al. |
| 2005/0176410 A1 | 8/2005 | Brooking et al. |
| 2005/0286519 A1 | 12/2005 | Ravikumar et al. |
| 2006/0072547 A1 | 4/2006 | Florkey et al. |
| 2006/0077971 A1 | 4/2006 | Flowler |
| 2006/0227959 A1 | 10/2006 | Michell |
| 2006/0229101 A1 | 10/2006 | LaBauve et al. |
| 2006/0258289 A1 | 11/2006 | Dua |
| 2007/0019623 A1 | 1/2007 | Alt et al. |
| 2007/0066273 A1 | 3/2007 | Laraia et al. |
| 2007/0117548 A1 | 5/2007 | Fernandez-Alonso et al. |
| 2007/0238472 A1* | 10/2007 | Wanless ............... 455/461 |
| 2008/0045186 A1 | 2/2008 | Black et al. |
| 2008/0137829 A1 | 6/2008 | Kaal et al. |
| 2008/0137834 A1 | 6/2008 | Kaal et al. |
| 2008/0139208 A1 | 6/2008 | Kaal |
| 2008/0144578 A1 | 6/2008 | Kaal |
| 2008/0152108 A1 | 6/2008 | Kaal et al. |
| 2008/0165790 A1 | 7/2008 | Kaal et al. |
| 2008/0192734 A1 | 8/2008 | Oruaas et al. |
| 2008/0205308 A1 | 8/2008 | Prehofer et al. |
| 2012/0033797 A1 | 2/2012 | Kaal et al. |
| 2012/0219009 A1 | 8/2012 | Kaal |

FOREIGN PATENT DOCUMENTS

| | | |
|---|---|---|
| EP | 0 695 059 A1 | 1/1996 |
| EP | 1 515 506 A1 | 3/2005 |
| EP | 1 643 740 | 4/2006 |
| EP | 1690165 | 8/2006 |
| GB | 2 398 458 A | 8/2004 |
| GB | 2 405 285 A | 2/2005 |
| WO | WO 99/67922 | 12/1999 |
| WO | WO 00/51331 A1 | 8/2000 |
| WO | WO 01/24478 A2 | 4/2001 |
| WO | WO 01/39469 | 5/2001 |
| WO | WO 01/63861 | 8/2001 |
| WO | WO 02/076049 | 9/2002 |
| WO | WO 02/078268 A1 | 10/2002 |
| WO | WO 03/003678 A1 | 1/2003 |
| WO | WO 2005/009019 A2 | 1/2005 |
| WO | WO 2005/084128 A2 | 9/2005 |
| WO | WO 2006/095787 A1 | 9/2006 |
| WO | WO 2007/044049 A2 | 4/2007 |
| WO | WO 2007/077550 A1 | 7/2007 |

OTHER PUBLICATIONS

Search Report Under Section 17 for GB 0723123.6, Date of Search: Apr. 18, 2008.

Notification Concerning Transmittal of International Preliminary Report on Patentability (Chapter I of the Patent Cooperation Treaty), from International Application No. PCT/IB2007/004260, dated Jun. 3, 2009.

Notification Concerning Transmittal of International Preliminary Report on Patentability (Chapter I of the Patent Cooperation Treaty), from International Application No. PCT/IB2007/004279, dated Jun. 3, 2009.

Examination Report under Section 18(3), Application No. GB0723119.4, Date of Report: Apr. 27, 2011, 1 pg.

"Advisory Action", U.S. Appl. No. 11/986,835, (Sep. 15, 2011), 3 pages.

"Advisory Action", U.S. Appl. No. 11/986,974, (Jun. 2, 2011), 3 pages.

"Examination Report under Section 18(3)", Application No. GB0723119.4, (Apr. 27, 2011), 1 page.

"Final Office Action", U.S. Appl. No. 11/986,835, (Jun. 23, 2010), 20 pages.

"Final Office Action", U.S. Appl. No. 11/986,835, (Jul. 8, 2011), 29 pages.

"Final Office Action", U.S. Appl. No. 11/986,973, (Apr. 13, 2011), 23 pages.

"Final Office Action", U.S. Appl. No. 11/986,973, (Apr. 24, 2012), 24 pages.

"Final Office Action", U.S. Appl. No. 11/986,974, (Mar. 17, 2011), 8 pages.

"Non Final Office Action", U.S. Appl. No. 11/986,973, (Oct. 22, 2010), 22 pages.

"Non Final Office Action", U.S. Appl. No. 11/986,973, (Nov. 23, 2011), 24 pages.

"Non Final Office Action", U.S. Appl. No. 11/986,976, (Oct. 27, 2011), 8 pages.

"Non-Final Office Action", U.S. Appl. No. 11/986,835, (Nov. 24, 2010), 25 pages.

"Non-Final Office Action", U.S. Appl. No. 11/986,835, (Dec. 21, 2009), 10 pages.

"Non-Final Office Action", U.S. Appl. No. 11/986,974, (Jul. 18, 2011), 11 pages.

"Non-Final Office Action", U.S. Appl. No. 11/986,974, (Sep. 29, 2010), 11 pages.

"Non-Final Office Action", U.S. Appl. No. 11/986,985, (Oct. 25, 2011), 12 pages.

"Non-Final Office Action", U.S. Appl. No. 13/195,541, (May 25, 2012), 4 pages.

"Notice of Allowance", U.S. Appl. No. 11/986,835, (Mar. 15, 2012), 13 pages.

"Notice of Allowance", U.S. Appl. No. 11/986,835, (Dec. 6, 2011), 13 pages.

"Notice of Allowance", U.S. Appl. No. 11/986,974, (Mar. 15, 2012), 12 pages.

"Notice of Allowance", U.S. Appl. No. 11/986,976, (Apr. 5, 2012), 4 pages.

"Notice of Allowance", U.S. Appl. No. 11/986,977, (May 3, 2011), 10 pages.

"Preliminary Report on Patentability and Written Opinion", International Application No. PCT/IB2007/004260, (Jun. 3, 2009), 8 pages.

"Preliminary Report on Patentability and Written Opinion", International Application No. PCT/IB2007/004279, (Jun. 3, 2009), 8 pages.

"Supplemental Notice of Allowance", U.S. Appl. No. 11/986,977, (Aug. 17, 2011), 2 pages.

"Supplemental Notice of Allowance", U.S. Appl. No. 11/986,977, (Jun. 21, 2011) 2 pages.

"Advisory Action", U.S. Appl. No. 11/986,973, (Jul. 17, 2012), 3 pages.

"Advisory Action", U.S. Appl. No. 11/986,985, (Jul. 19, 2012), 3 pages.

"Final Office Action", U.S. Appl. No. 11/986,985, (Jun. 7, 2012), 14 pages.

"Final Office Action", U.S. Appl. No. 13/195,541, (Aug. 15, 2012), 6 pages.

"Non-Final Office Action", U.S. Appl. No. 13/460,249, (Jun. 1, 2012), 9 pages.

"Notice of Allowance", U.S. Appl. No. 13/460,249, (Aug. 3, 2012), 7 pages.

* cited by examiner

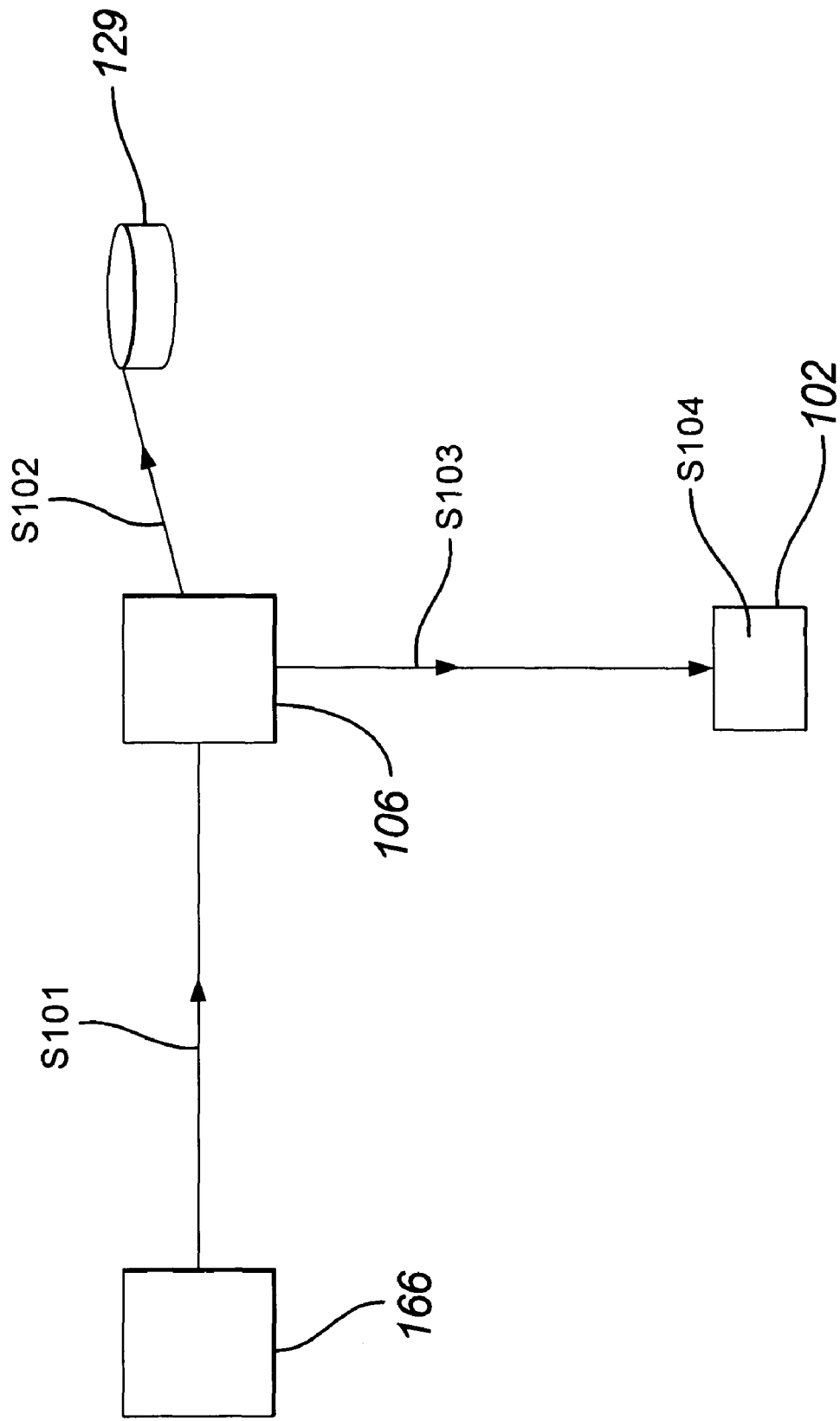

COMMUNICATON SYSTEM

RELATED APPLICATIONS

This application claims priority under 35 U.S.C. §119 or 365 to Great Britain Application No. 0623621.0, filed Nov. 27, 2006 and Great Britain Application 0723118.6 filed Nov. 23, 2007. The entire teachings of the above applications are incorporated herein by reference.

TECHNICAL FIELD

The present invention relates to a method for handling communication in a communication system.

BACKGROUND

Communication systems link together two communication devices so that the devices can send information to each other in a call or other communication event. Information may include voice, text, images or video.

One such communication system is a peer to peer system, in which a plurality of end users can be connected for communication purposes via a communications structure such as the internet. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer systems and other communication systems that use the internet or any other packet switched network employ voice over IP (internet protocol) protocols (VoIP) to transmit data. These systems are commonly referred to as VoIP systems. VoIP systems are beneficial to the user as they are often of significantly lower cost than communication networks, such as fixed line or mobile networks, otherwise referred to as public switched telephone networks (PSTN). This may particularly be the case for long distance calls.

The connection of two communication devices using more than one type of network is becoming increasingly common. In some cases a call may be transmitted via more than one network in an attempt to reduce the cost of the call. For example a call between two devices located in a PSTN network may be transmitted via the internet. In other cases it is necessary to transmit the call via two networks when each device is located in a different network.

Gateways are provided at the interface between different networks to translate call data from a form required by a protocol of one network into a form required by a protocol of another network. However in some cases some data associated with the call may not be supported by the protocol of one of networks. In this case the data associated with the call is lost.

For example a communication device such as a mobile phone located in a PSTN network may be arranged to identify the origin of an incoming call. However if the call has originated from a device located in the internet the PSTN network cannot recognise and transmit the identity of user of the device to the mobile phone. As such the identity of the calling party will be lost.

SUMMARY

It is therefore an aim of embodiments of the invention to address at least one of the above identified problems.

According to a first aspect of the invention there is provided a method of receiving a communication event from a calling entity located in a communication network comprising a first network and a second network, at a receiving device associated with a user located in the communication system, the method comprising: associating a first identity recognisable in the first network with a second identity recognisable in the second network for both the user and the calling entity at a data store located in the second network; providing the first and second identities for the calling entity to the receiving device via the second network; receiving at a node in the second network associated with the user, the communication event together with the second identity for the calling entity via the second network, wherein the communication event is addressed with the second identity of the user; querying the data store with the second identity of the calling entity and the second identity of the user to determine the first identity of the calling entity and the first identity of the user; receiving at the receiving device associated with the user the communication event together with the first identity for the calling entity via the first network, wherein the communication event is addressed with the first identity of the user; and determining the second identity of the calling entity at the receiving device associated with the user using the first identity of the calling entity.

According to a second aspect of the present invention there is provided a network node for receiving a communication event for a user of a communication network from a calling entity, said communication network comprising a first network and a second network, said network node executing a communication instance arranged to store a first identity recognisable in the first network in association with a second identity recognisable in the second network for both the user and the calling entity; to transmit the first and second identities for the calling entity to a receiving device associated with the user via the second network; to receive the communication event together with the second identity for the calling entity via the second network, wherein the communication event is addressed with the second identity of the user; and to determine the first identity of the calling entity and the first identity of the user using the second identity of the calling entity and the second identity of the user; wherein the communication instance is further arranged to transmit the communication event together with the first identity for the calling entity to the receiving device via the first network using the first identity of the user such that the receiving device may determine the second identity of the calling entity using the first identity of the calling device.

According to a third aspect of the present invention there is provided a receiving device arranged to receive a communication event from a calling entity via a communication system comprising a first network and a second network, said receiving device comprising: a processor executing a client program arranged to receive a first identity recognisable in the first network and a second identity recognisable in the second network for the calling entity; a receiver arranged to receive a communication event together with the first identity of the calling entity via the first network; wherein the client program is further arranged to determine the second identity of the calling entity using the first identity.

BRIEF DESCRIPTION OF THE DRAWINGS

For a better understanding of the present invention and as to how the same may be carried into effect, embodiments of the present invention will now be described by way of example only with reference to the following drawings:

FIG. 8 is a diagram showing the reception of a command in accordance with an alternative embodiment of the present invention.

DETAILED DESCRIPTION

Figure 1:
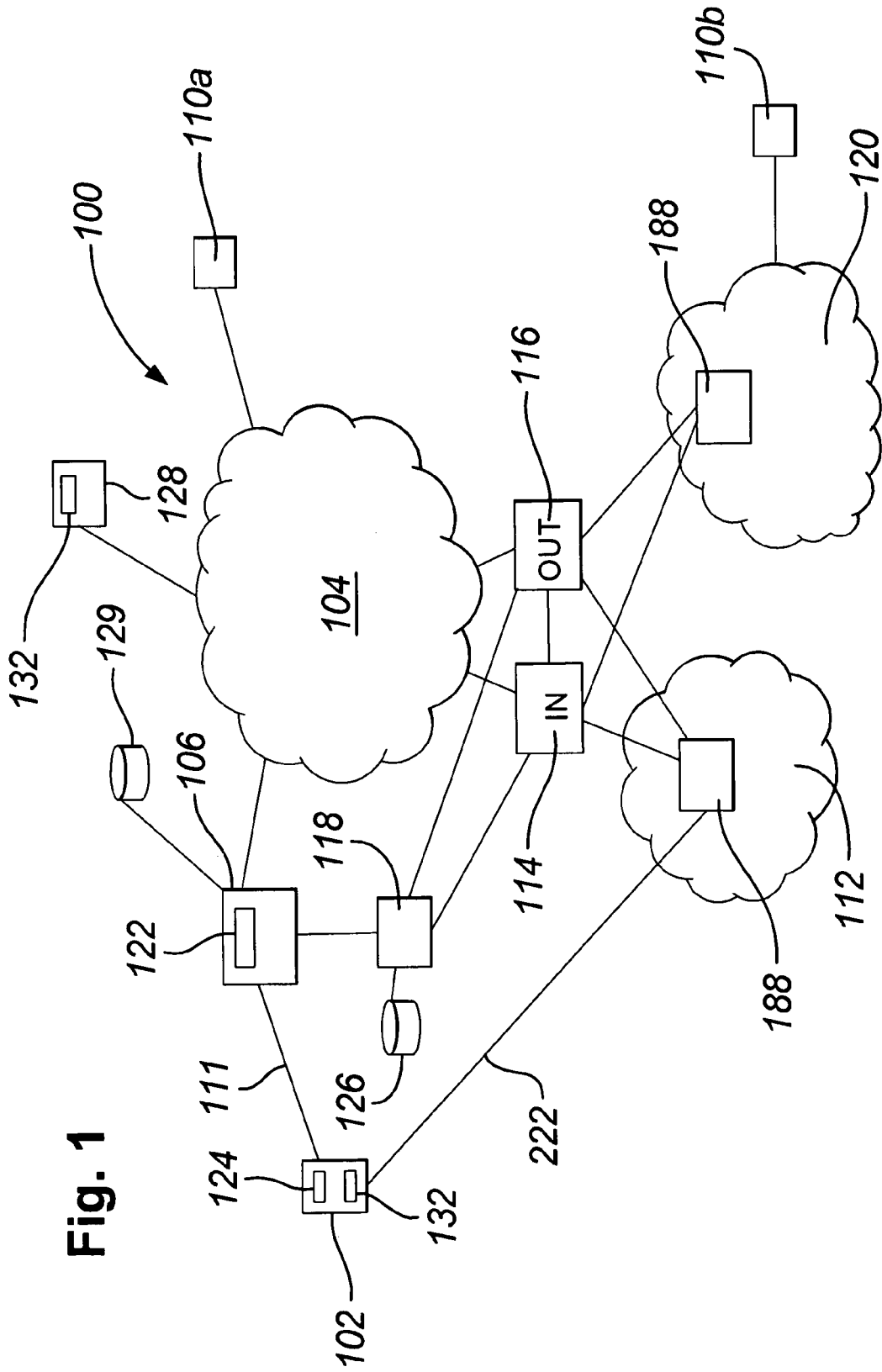
FIG. 1 is a schematic representation of a communication system in accordance with an embodiment of the invention.

Reference will first be made to FIG. 1, in which is shown a communication system 100, including a packet switched network 104 and circuit switched networks 112 and 120. In one embodiment the packet switched network 104 may be the internet. Data may be transmitted via the internet 104 via a peer to peer system. The circuit switched networks 112, 120 may be PSTN (Public Switched Telephone Network) networks.

A user device 102 is shown to be connected to the internet 104 via a session node 106. The user device 102 is also connected to the PSTN network 120. In one embodiment of the invention the user device is connected to the PSTN network 112 via a circuit switched connection 222 and to the session node 106 via a packet switched connection 111. The circuit switched connection 222 and the packet switched connection 111 may be provided by a GSM (Global System for Mobile Communications) network (not shown). For example the packet switched connection may be provided by a GPRS (General Packet Radio Service) connection of the GSM network whilst the circuit switched connection may be provided by a GSM audio connection of the GSM network. In a preferred embodiment of the invention the packet switched connection 111 is used to transmit packet data according to an internet protocol such as Transmission Control Protocol (TCP).

The user device 102 may be, for example, a personal computer, a gaming device, a personal digital assistant, a suitably enabled mobile phone, or other device able to connect to the network 104.

In accordance with an embodiment of the invention the session node 106 runs a communication instance 122 defining a session dedicated to a user of the user device 102. The communication instance 122 enables the user of the user device 102 to communicate across the communication system 100. The session node 106 is able to concurrently run a plurality of communication instances for a number of other users operating other user devices (not shown).

The user device 102 runs a client software program 124 that provides a client interface on the user device and allows the user of the user device 102 to communicate with the communication instance 122 running on the session node 106.

The client program 124 running on the user device has a number of different components or layers for implementing various functions, including a protocol layer 402 (FIG. 2a) for managing the interface with the GSM network. The interface with the GSM network will be described hereinafter with reference to FIG. 2b.

Figure 2A:
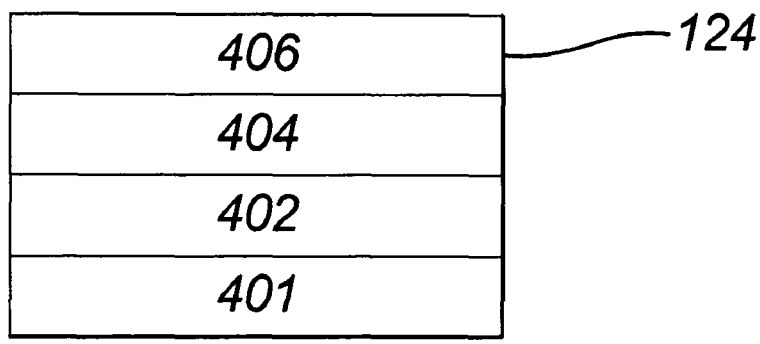
FIG. 2a is a diagram showing the protocol stack of a client program in accordance with an embodiment of the present invention.

FIG. 2a shows a protocol stack for the client program 124 according to an embodiment of the present invention. The protocol stack shows an operating system layer 401, a protocol layer 402, a client engine layer 404 and a client user interface layer 406. Each layer is responsible for specific functions. Because each layer usually communicates with two other layers, they are regarded as being arranged in a stack as shown in FIG. 2a. The operating system layer 401 manages the hardware resources of the user device 102 and handles data being transmitted to and from the session node 106. The operating system layer also handles the data being transmitted to and from the network 112. The client protocol layer 402 of the client software communicates with the operating system 401. Processes requiring higher level processing are passed to the client engine layer 404. The client engine 404 also communicates with the user client user interface layer 406. The client engine may be arranged to control the client user interface layer 406 to present information to the user via user interface means of the user device and to receive information from the user via the user interface means of the user device. The user interface means may comprise a speaker, a microphone, a display screen and a keyboard. This list is not exhaustive.

Figure 2B:
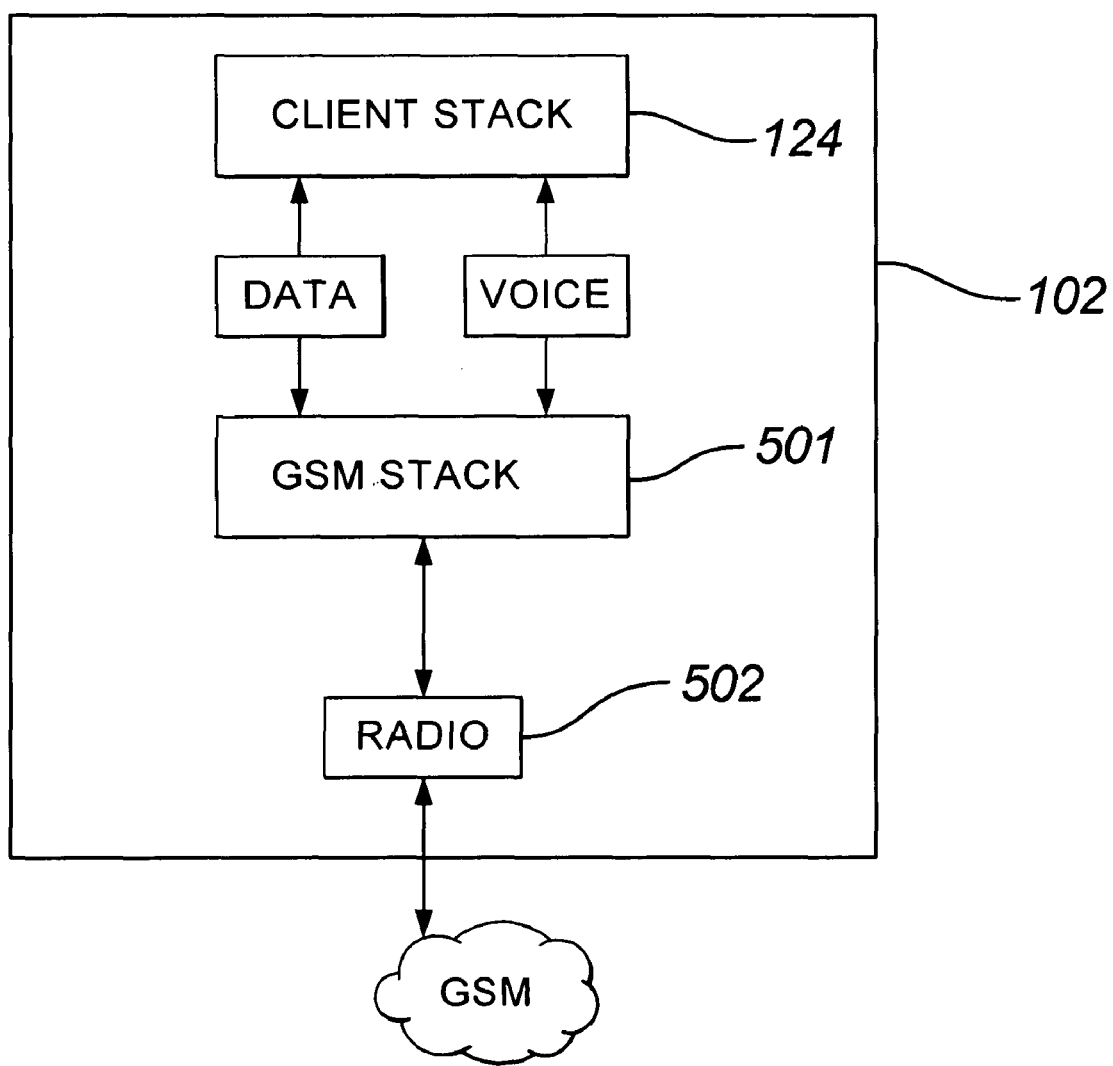
FIG. 2b is a schematic diagram showing the transmission of data between the client protocol stack and the GSM protocol stack in a user device in accordance with an embodiment of the present invention.

FIG. 2b is a schematic diagram showing the transmission of data between the client protocol stack and the GSM protocol stack in the user device 102. As shown in FIG. 2b the user device 102 further comprises a GSM protocol stack 501 and a radio transceiver 502. Information transmitted from the GSM network to the user device is received by the transceiver 502. The data received from the GSM network is processed by GSM protocol stack 501 before it is transmitted to the client program 124. Similarly, information to be transmitted to the GSM network from the client program 124 is processed by the GSM protocol stack 501 before it is transmitted to the GSM network via the transceiver 502. The operation of the GSM protocol stack 501 is known in the art and will not be described in detail herein.

Reference is again made to FIG. 1. As shown in FIG. 1 the peer to peer system on the internet 104 comprises an inbound gateway 114 and an outbound gateway 116. The inbound gateway 114 and the outbound gateway 116 are connected to PSTN gateways 188 located in the PSTN networks. The inbound gateway 114 is arranged to receive data for the peer to peer system on the internet 104 from the PSTN gateways 188. The outbound gateway 116 is arranged to transmit data from the peer to peer system on the internet 104 to the to the PSTN gateways 188.

Also shown in FIG. 1 is a profile node 128. The profile node 128 is responsible for storing user profile information for users of the peer to peer system. The user profile information includes login information for logging into the peer to peer system and a contact list 132 associated with each user of the peer to peer system. The contact list 132 comprises the addresses of, for example, other users of the communication system stored as contacts by a user.

Figure 3:
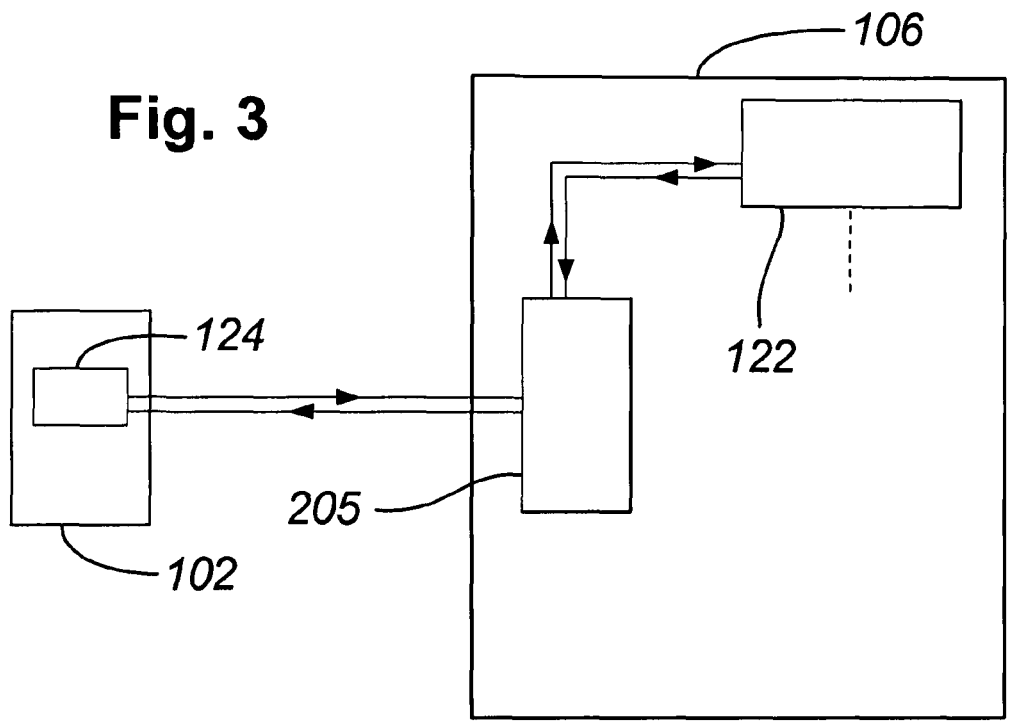
FIG. 3 is a schematic representation of part of the communication system shown in FIG. 1.

The communication instance 122 running on the session node 106 manages the communication between the client program 124 running on the device 102 and the peer to peer system on the internet 104. FIG. 3 shows the connection path between the communication instance 122 on the session node 106 and the client program 124 running on the user device 102. As shown in FIG. 3, the session node 106 further comprises a core module 205 for allocating a communication instance 122 to a client program 124.

In accordance with an embodiment of the invention the client program 124 running on the user device 102 is arranged to set up a connection with the session node 106. The client program 124 sends the session node 106 data relating to the user device 102 via the packet switched connection 111 in a data packet. The data packet may include the attributes listed in table 1:

TABLE 1

| KEY | TYPE | ATTRIBUTE |
|---|---|---|
| CHUNKTYPE | integer | CLIENTDATA |
| DEVICE_PSTNNUMBER | string | device PSTN number in international notation. |

As shown in table 1, the data packet includes an attribute defining an IP address of the user device and an attribute defining a PSTN number of the device. The PSTN address identifies the user device 102 in the PSTN network 112.

After a connection between the client program 124 and the session node 106 has been established the user of the user device may then provide login information to the session node 106 in order to log into the peer to peer system on the internet 104.

The session node may verify the login information provided from the user device against the profile information for the user of the user device 102 stored on the profile node 128. On verification of the login information provided from the user device 102 the core module 205 will assign a dedicated communication instance 122 to the client program 124.

The communication instance 122 associates the identity user of the user device as defined by at least part of the login details of the user with the identity of the device as defined by the PSTN number of the device. In one embodiment of the invention the communication instance may store the identity of the user together with the identity of the user device in a data store 129 associated with the communication instance.

According to an embodiment of the invention it is possible for the user of the user device to log into the peer to peer system using more than one user device. According to this embodiment of the invention the communication instance will associate the identity of each device with the identity of the user in the peer to peer system.

Once the session node 106 has assigned a communication instance 122 to the user device 102 the communication instance 122 will provide the client program 124 with data to enable to the client program to establish a communication event with an entity in the communication system 100.

The entity may be any node in the communication system 100 that is capable of transmitting information to the user device 102. For example the entity may be another user device or a network node in the communication system 100. The entity may correspond to voice mail records, or other data records associated with the user of the user device. Additionally the entity may be an entity arranged to instruct the client program to carry out control commands.

An entity is located by an address in the network in which it resides. The address of an entity that resides in the internet 104 may be for example an IP address, a URI (Uniform Resource Indicator), a username, of a VoIP device. The address of an entity that resides in the PSTN network may be a PSTN number associated with the entity.

In one embodiment of the invention the entity may be located in more than one network. For example the entity may be a user that is logged into the peer to peer system of the internet using two or more user devices. In this case an entity will have more than one associated addresses.

The user device 102 may transmit or receive a communication event with an entity via more than one network of the communication system. For example the user device 102 may receive a call via the PSTN network 112 from an entity located in the internet 104.

In accordance with an embodiment of the invention the communication instance 122 is arranged to allocate an entity an identity that may be transmitted and interpreted by both the PSTN network and the peer to peer system on the internet. In this case the identity of the entity may be resolved to the address of the entity by a node located in the internet 104. In a preferred embodiment of the invention the allocated identity is a PSTN number.

For example, if the entity is located in the internet, the IP address of the entity the will not be recognized by the PSTN network. The communication instance 122 is arranged to allocate a PSTN number to the entity that may be used to identify the entity during a call with the entity via the PSTN network.

As shown in FIG. 1 a call manager 118 is connected to the session node 106, the inbound gateway 114 and the outbound gateway 116. The call manager has access to the data store 126. In FIG. 1 the data store 126 is shown as being associated with the call manager 118. In an alternative embodiment of the invention the data store 126 may be associated with the call session node 106.

Figure 6:
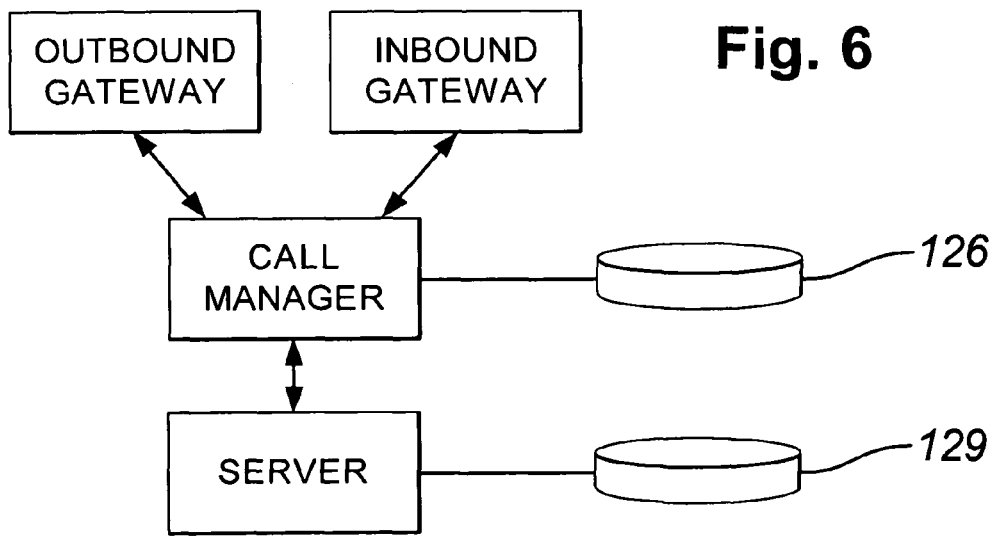
FIG. 6 shows the logical connections between a call manager, a session node, an inbound gateway and an outbound gateway according to an embodiment of the present invention.

In the embodiment shown in FIG. 1 the call manager 118 is shown as being located separately from the session node 106 and the gateways 114 and 116. In alternative embodiments the call manager 118 may however form part of either the session node 106 or of one of the gateways 114 or 116. The logical connections between the call manager, the session node, the inbound gateway and the outbound gateway are shown in FIG. 6.

The call manager 118 is arranged to provide the communication instance 122 with a PSTN number to be allocated to an entity in response to a request from the communication instance. The communication instance is arranged to allocate the PSTN number to the entity and to provide the address of the entity to the call manager. The call manager is then arranged to store the allocated PSTN number in the data store 126 together with the address of the entity.

In a preferred embodiment of the invention the address of an entity is determined from the contact list 132 provided from the profile node 128. This embodiment of the invention will be described with reference to FIG. 4.

Figure 4:
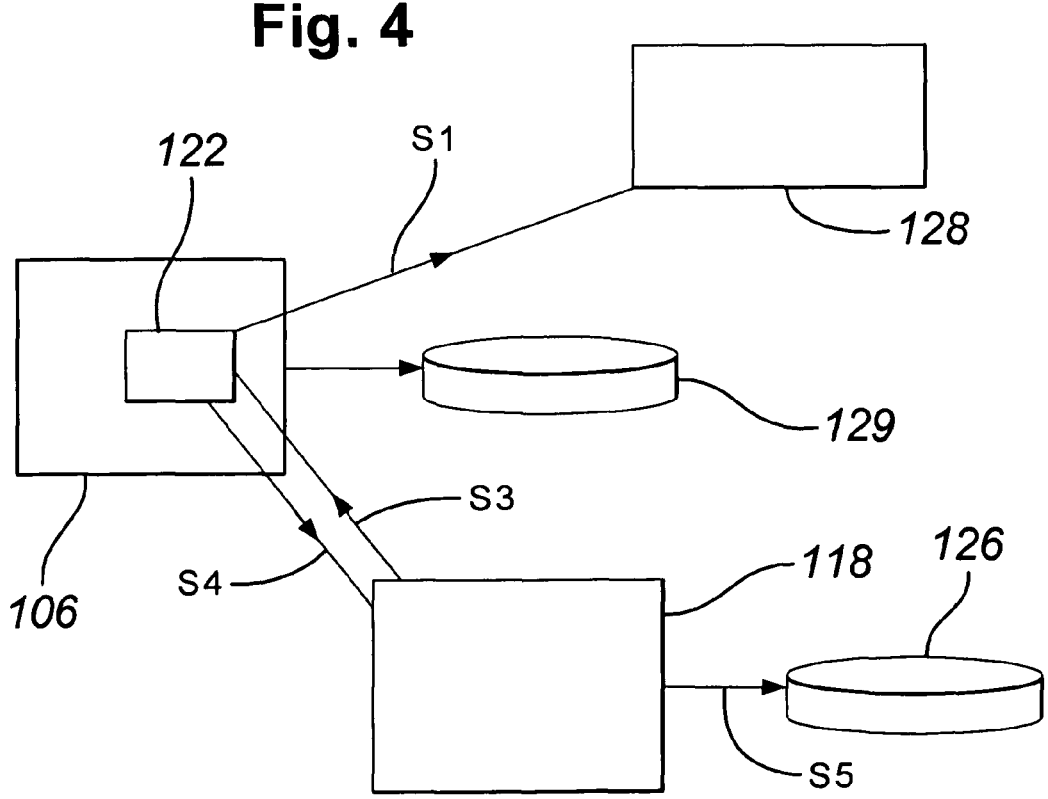
FIG. 4 is a schematic representation of part of the communication system shown in FIG. 1 according to an embodiment of the present invention.

FIG. 4 is a diagram showing the steps for allocating a PSTN number to an entity in accordance with a preferred embodiment of the invention.

In step S1 the communication instance 122 is arranged to retrieve the addresses of the entities of that are listed as contacts in the contact list 132 associated with the user of the user device 102. The addresses of the entities are retrieved from the profile node 128.

In step S2 the communication instance stores the address of each entity in the data store 129. In a preferred embodiment of the invention the entire contact list 132 is stored in the data store 129.

In step S3 the communication instance 122 is then arranged to retrieve a PSTN number for each entity listed in the contact list from the call manager.

In step S4 the communication instance is arranged to allocate each PSTN number to each entity listed in the contact list and to report the addresses of each entity allocated a PSTN number to the call manager.

In step S5 the call manager 118 is arranged to store in the data store 126 a PSTN number in association with the address for each entity listed in the contact list.

In one embodiment of the invention the call manager is arranged to additionally store in the data store 126 the PSTN number of the user device 102 in association with the PSTN number allocated to the entity. The PSTN number of the user device may be reported to the call manager in either step S3 or step S4. In this embodiment of the invention the address of the entity may be resolved using the PSTN number allocated to the entity and the PSTN number of the device. In this case one PSTN number may be allocated for use by more than one user.

The contact list 132 together with the PSTN numbers allocated to each entity in the contact list are transmitted from the communication instance to the client program 124.

In a preferred embodiment of the invention the allocated PSTN numbers and the contact list 132 are transmitted to the client program 124 in data packets via the data connection 111. The allocated PSTN numbers may be provided in a separate data packet from the contact list 132.

At least part of the PSTN numbers may be provided to the client program in a 'call set up' data packet comprising the attributes listed in table 2:

TABLE 2

| KEY | TYPE | ATTRIBUTE |
|---|---|---|
| CHUNKTYPE | integer | CALLSETUP |
| CALLMETHOD | integer | a numeric value identifying calling method to use |
| DIALIN_NUMBER_PREFIX | string | first number in dial-in number range, for example " +3725521000" |
| DIALIN_NUMBER_RANGE_SIZE | integer | # of numbers in dial-in block, for example 1000 |
| VOICEMAIL_NUMBER_PREFIX | string | dial-in number range for listening voicemails |
| VOICEMAIL_NUMBER_RANGE_SIZE | integer | # of numbers in voicemail number block |

In one embodiment of the invention each PSTN number for calling an entity may be listed separately in the data packet. However in a preferred embodiment, each PSTN number may be determined by the client program 124 from a first number and a second number corresponding to an index number identifying the contact in the contact list (see table 3). The range of indexes may be limited by of a number range defined in the data packet, as shown in table 2.

Table 3 shows the attributes of the data packet containing the contact list 132. Each entity in the contact list is given an index value starting from 1. The attribute container containing the contact list may further include the contacts username, or URI for contacting the contact using the peer to peer system, and the name of the contact.

TABLE 3

| KEY | TYPE | ATTRIBUTE |
|---|---|---|
| CHUNKTYPE | integer | CONTACT |
| CONTACTINDEX | integer | contact index value, starting from 1 |
| SKYPENAME | string | contact username |
| FULLNAME | string | |
| PSTNNUMBER | string | |

The client program 124 may determine the PSTN number by arithmetically adding the first number to the second number. For example if the first number is defined as:
+3725521020
and the second number, corresponding to an index, is:
33
the PSTN number for the contact identified by index 33 will be:
+3725521053

Alternatively the client program may determine the PSTN number by appending the second number corresponding to a member of the number range to the first number. For example, if the first number is:
+37255210
and the index corresponding to the entity is:
33
the PSTN number will be:
+3725521033

In one embodiment of the invention the call method attribute referred to in table 2 may indicate how the PSTN number should be determined from the information provided in the data packet. For example, the call method may specify whether the PSTN number should be determined by arithmetically adding the member of the number range to the first number, or by appending the member of the number range to the first number, or whether the entire PSTN number is listed in the data packet.

The communication instance 122 is arranged to send the contact list 132 to the client program 124. In the case where the call method requires that part of the PSTN number is derived using the index of the contract, the client program 124 may generate a PSTN number for each contract having an index. In the case where the call method indicates that a list of entire PSTN numbers are provided in the call set up data packet the client program may determine which PSTN number corresponds to which entity by correlating the position of a PSTN number in the list with the index number provided for each entity in the contact list.

In an embodiment of the invention a predefined PSTN number, or index, is reserved for communication events that occur with entities that are not listed in the contact list. In a preferred embodiment of the invention the index '0' is reserved for entities that are not listed on the contact list. Additionally, other numbers may be reserved for transmitting control commands from the network 104 to the client program 124. This will be described in more detail hereinafter.

In accordance with an embodiment of the invention the user device 102 may receive calls from an entity located in the communication network via the PSTN network. The user device 102 may also establish a call to an entity located in the communication network 100 via the PSTN network using the PSTN number allocated to the entity.

Figure 5:
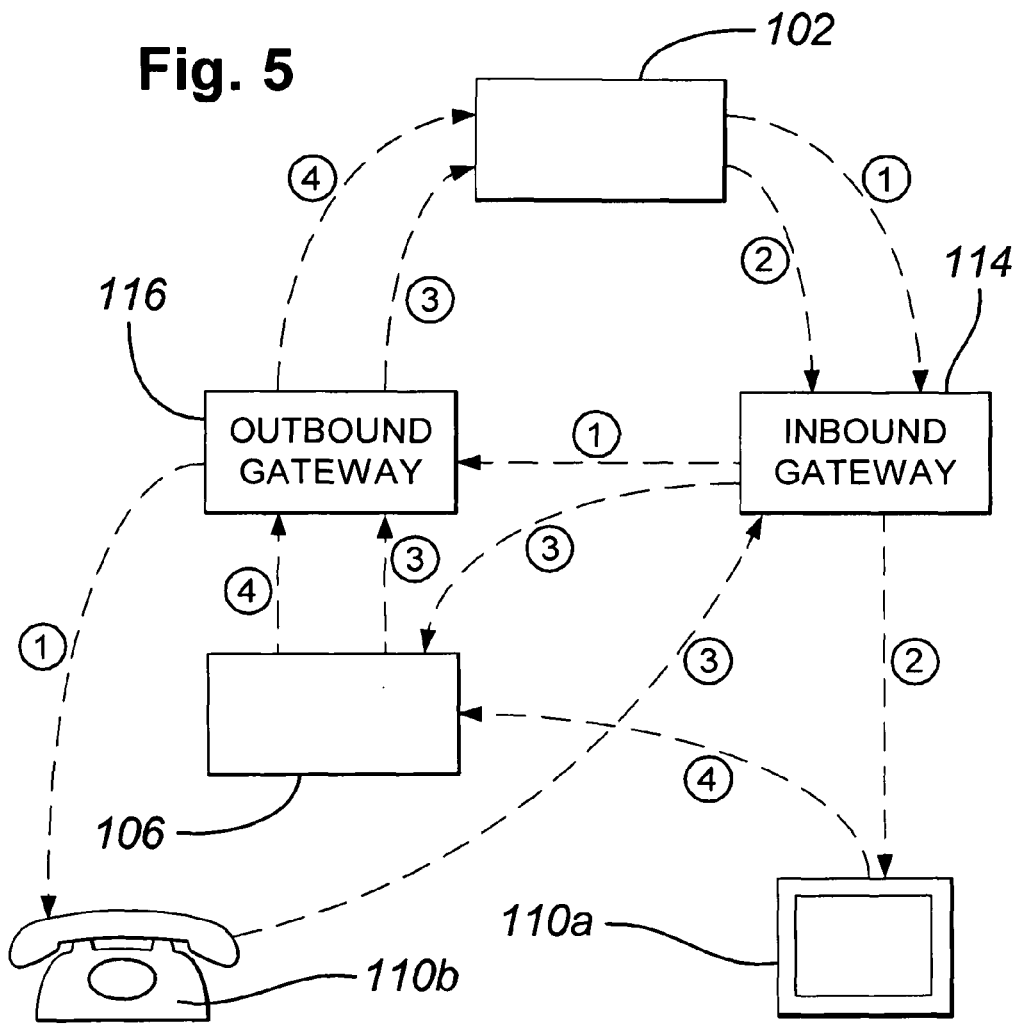
FIG. 5 shows the call connections made when placing calls between a user device and entities located in the communication system according to an embodiment of the present invention.

FIG. 5 shows the call connections made when placing calls between the user device 102 and entities located in the communication network. More specifically FIG. 6 shows the following call connections:

(1) an outbound call from the user device 102 to an entity 110b located in the PSTN network;

(2) an outbound call from the user device 102 to an entity 110a located in the internet 104;

(3) an inbound call to the user device 102 from an entity 110b located in the PSTN network; and (4) an inbound call to the user device 102 from an entity 110a located in the PSTN network.

As shown in FIG. 5, inbound calls made to the client running on the user device 102 are routed to the session node 106 from the calling entity. The session node 106 is then able to determine the PSTN number of the device and the PSTN number allocated to the entity by querying the data store 126. The method of receiving a call at the user device 102 will now be describe in detail in relation to FIG. 7.

Figure 7:
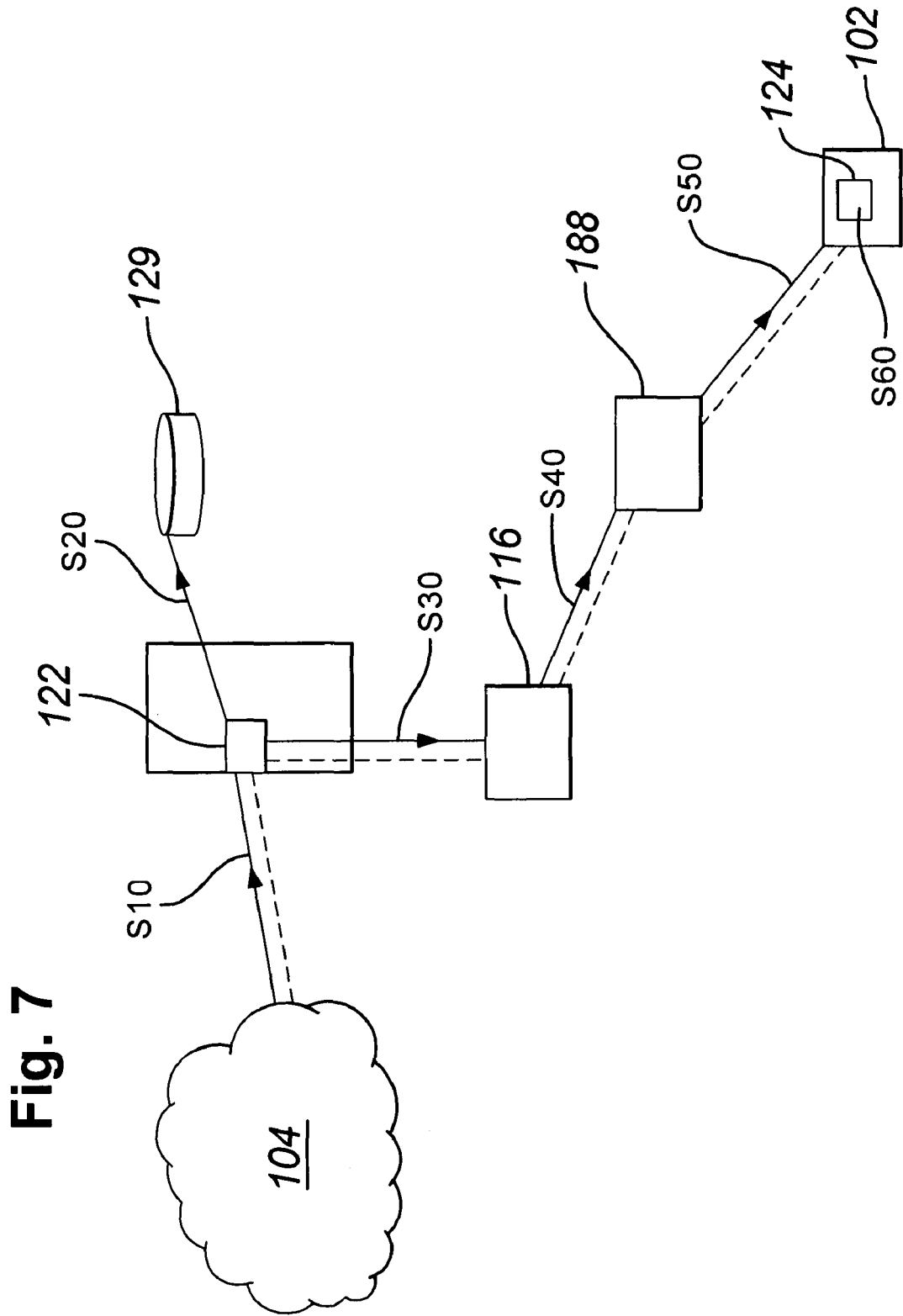
FIG. 7 is a diagram showing the reception of a call in accordance with an embodiment of the present invention.

FIG. 7 is a diagram illustrating the reception of a call at the user device 102. In FIG. 7 the control data connection for handling the call set up and the media data connection for transmitting the media data are shown separately. The control data connection is shown as a solid line and the media data connection is shown as a broken line.

The call may originate from an entity located in the packet switched network 104 or from an entity located in the circuit switched network 112. The following method will be described the case where a call is initiated from an entity located in the internet 104.

In step S10, an incoming call from the packet switched network 104 is received at the communication instance 122 running on the session node 106. The control data of the incoming call will identify the destination of the call with the username associated with user of the user device 102. The username of the user is used to locate the communication instance 122 in the peer to peer system on the internet 104. The control data may also identify the origin of the call by including username of the calling entity.

In step S20 the communication instance searches the data store 129 to determine the PSTN number of the device 102. The communication instance may also search the contact list 132 associated with the user of the device 102 to determine if the username of the calling entity matches an entity listed in the contact list 132. If calling entity is listed in the contact list 132, the PSTN number allocated to the calling entity will be retrieved from the data store 129. If the calling entity is not listed in the contact list the PSTN number reserved for entities not listed on the contact list will be retrieved.

In step S30, the control data connection comprising the PSTN number of the device 102 is transmitted, together with the media data connection, to the outbound gateway 116. The control data may also include the PSTN number retrieved from the data store 129 to identify the calling entity.

In step 40 the call is transmitted from the outbound gateway 116 to the PSTN gateway 188 using the PSTN number of the device. The PSTN number retrieved from the data store 129 to identify the calling entity is also transmitted with the call.

In step S50 the call is transmitted to the user device 102 via the PSTN network. The PSTN number retrieved to identify the calling entity is recognised by the PSTN network and may be transmitted by the PSTN network to identify the origin of the call.

If the calling entity has an allocated PSTN number, in step S60 the client program 124 running on the user device 102 is arranged to resolve the allocated PSTN number to the associated contact details of the entity provided in the contact list 132. This may be achieved by mapping the PSTN number of the calling entity to the username of the contact using the mapping method described previously. For example if the PSTN number associated with the calling entity is generated at the client program 124 using the index representing the entity, the client program may be arranged to subtract the first number from the PSTN number to derive the index and identify the contact. The username of the contact may then be displayed on the display of the user device to show that there is an incoming call from that contact.

Alternatively, if the reserved PSTN number was transmitted with the call to identify that the calling entity was not stored on the contact list 132, the client program 124 may be arranged to display the predefined text on the display of the user device which states that the caller is 'unknown'.

In an alternative embodiment of the invention the media data connection is not established via the communication instance 122 as shown in FIG. 7. Instead steps S10 to S30 may be used to set up the control data connection only. The media data connection may then be established between the outbound gateway and the calling entity after the control data connection is established.

In an alternative embodiment of the invention the identity calling entity in the peer to peer system may be arranged to transmit a command to be carried out by the client program 124. The command may for example relate to an instruction for the client program 124 to establish a connection with the session node 106. The command may originate either from another node located in the network 104 or from the session node 106. This embodiment of the invention will be described in relation to FIG. 8.

In step S101 the node 166 transmitting the communication event comprising the command is arranged to address the communication event to the username of the user of the device 102. The command is identified as the caller identity of communication event.

In step S102 the communication instance receives the communication event. The communication instance is arranged to search the data store 129 to retrieve a PSTN number corresponding to the command listed in the contact list 132. Additionally the communication instance is arranged to retrieve the PSTN number of the user device associated with the username.

In step S103 the communication event is routed to the user device 102 via the PSTN network using the PSTN number of the user device 102. The PSTN number allocated to the command is transmitted with the communication event as the caller identity of the communication event.

In step S104 the client program is arranged to resolve the caller identity of the communication event to the command listed in the contact list. The client program is then arranged to carry out the command. For example, if the command is 'connect' the client program will establish a connection with the session node 106.

While this invention has been particularly shown and described with reference to preferred embodiments, it will be understood to those skilled in the art that various changes in form and detail may be made without departing from the scope of the invention as defined by the claims.

What is claimed is:

1. A method of receiving a communication event from a calling entity located in a communication system comprising a first network and a second network, at a receiving device associated with a user located in the communication system, the method comprising;
   associating a first identity recognisable in the first network with a second identity recognisable in the second network for both the user and the calling entity at a data store located in the second network;
   providing the first and second identities for the calling entity to the receiving device via the second network;
   receiving at a node in the second network associated with the user, the communication event together with the second identity for the calling entity via the second network, wherein the communication event is addressed with the second identity of the user;
   querying the data store with (i) the second identity of the calling entity received at said node, and (ii) the second identity of the user with which the communication event is addressed, to determine the first identity of the calling entity and the first identity of the user;
   receiving at the receiving device associated with the user the communication event together with the determined first identity for the calling entity via the first network, wherein the communication event is addressed with the determined first identity of the user; and
   determining the second identity of the calling entity at the receiving device associated with the user using said received first identity for the calling entity and said provided first and second identities for the calling entity.

2. A method as claimed in claim 1 wherein the node in the second network associated with the user is arranged to communicate via a communication system operating on the second network on behalf of the user of the receiving device.

3. A method as claimed in claim 2 wherein the node associated with the user is arranged to log into the communication system operating on the second network on behalf of the user of the receiving device.

4. A method as claimed in claim 1 wherein the first identity and the second identity associated with the user are transmitted from the receiving device to the data store.

5. A method as claimed in claim 4 wherein the first identity and the second identity associated with the user are transmitted from the receiving device to the data store via the node associated with the user.

6. A method as claimed in claim 1 wherein the second identity of the calling entity is determined from a contact list associated with the user of the receiving device.

7. A method as claimed in claim 6 wherein the contact list defines a plurality of entities capable of establishing a communication event with the user device, and wherein one of said plurality of entities is said calling entity.

8. A method as claimed in claim 7 wherein providing the first and second identities for the calling entity to the receiving device comprises providing a first identity recognisable in the first network and a second identity recognisable in the second network for each of said plurality of entities defined in the contact list.

9. A method as claimed in claim 8 wherein the first and second identities of the plurality of entities defined in the contact list are provided in response to a request from the receiving device.

10. A method as claimed in claim 8 wherein at least part of the first identities of the plurality of entities are provided to the receiving device in a first data packet.

11. A method as claimed in claim 10 wherein the second identities of the plurality of entities are provided in a second data packet.

12. A method as claimed in claim 11 wherein determining the second identity using the first identity of the entity comprises selecting a second identity from the second identities provided in the second data packet using the first identity.

13. A method as claimed in claim 1 wherein the communication event comprises an instruction to be carried out at the user device.

14. A method as claimed in claim 13 wherein the instruction is defined by the second identity of the calling entity.

15. A method as claimed in claim 1 wherein the calling entity is a user of the communication network.

16. A method as claimed in claim 2 wherein the communication system operating on the second network is a peer to peer system.

17. A network node for receiving a communication event for a user of a communication system from a calling entity, said communication system comprising a first network and a second network, said network node executing a communication instance arranged to:
   store a first identity recognisable in the first network in association with a second identity recognisable in the second network for both the user and the calling entity;
   transmit the first and second identities for the calling entity to a receiving device associated with the user via the second network;
   receive the communication event together with the second identity for the calling entity via the second network, wherein the communication event is addressed with the second identity of the user; and
   determine the first identity of the calling entity and the first identity of the user using: (i) the received second identity of the calling entity, and (ii) the second identity of the user with which the communication event is addressed;
   wherein the communication instance is further arranged to transmit the communication event together with the determined first identity for the calling entity to the receiving device via the first network using the determined first identity of the user such that the receiving device may determine the second identity of the calling entity using the first identity of the calling device.

18. A receiving device arranged to receive a communication event from a calling entity via a communication system comprising a first network and a second network, the receiving device comprising:
   a processor executing a client program arranged to receive a first identity recognisable in the first network and a second identity recognisable in the second network for the calling entity;
   a receiver arranged to receive a communication event together with the first identity of the calling entity via the first network;
   wherein the client program is further arranged to determine the second identity of the calling entity using (i) the first identity of the calling entity received with the communication event, and (ii) said received first and second identities for the calling entity.

19. A receiving device as claimed in claim 18 wherein the second identity of the calling entity defines the contact details of the calling entity.

20. A receiving device as claimed in claim 18 wherein the second identity of the calling entity defines an instruction to be carried out by the client program.

* * * * *